United States Patent
Vivanco et al.

(10) Patent No.: US 8,908,515 B1
(45) Date of Patent: Dec. 9, 2014

(54) MANAGING CONGESTION IN A WIRELESS COMMUNICATION NETWORK

(75) Inventors: Daniel Vivanco, Reston, VA (US); Aik Chindapol, Washington, DC (US)

(73) Assignee: Sprint Spectrum L.P., Overland Park, KS (US)

( * ) Notice: Subject to any disclaimer, the term of this patent is extended or adjusted under 35 U.S.C. 154(b) by 742 days.

(21) Appl. No.: 13/108,514

(22) Filed: May 16, 2011

(51) Int. Cl.
*H04L 12/26* (2006.01)
*H04L 12/56* (2006.01)

(52) U.S. Cl.
USPC .................. 370/231; 370/232; 370/236

(58) Field of Classification Search
USPC .......... 370/229, 230, 235, 236, 231, 232, 252
See application file for complete search history.

(56) References Cited

U.S. PATENT DOCUMENTS

| | | | |
|---|---|---|---|
| 2005/0003824 A1 | 1/2005 | Siris | |
| 2009/0067335 A1 | 3/2009 | Pelletier et al. | |
| 2011/0032935 A1* | 2/2011 | Yang | 370/389 |

* cited by examiner

*Primary Examiner* — Michael Thier
*Assistant Examiner* — Feben M Haile (57) ABSTRACT

A packet is marked to indicate congestion in the wireless communication network when the packet does not indicate congestion in the wireless communication network, the utilization of RF resources meets a utilization criteria, and a network congestion metric meets the congestion criteria.

17 Claims, 6 Drawing Sheets

Downlink RF utilization: 75%
MCS utilization distribution: QPSK 60%; 16QAM 10%; 64QAM 5%
Marked packets received within time period: No

| Packet | MCS | Application |
|--------|-----|-------------|
| Pi | QPSK½ | video application |
| Pj | QPSK½ | web browser application |
| Px | 16QAM½ | email application |
| Pw | 64QAM¾ | web browser application |

MANAGING CONGESTION IN A WIRELESS COMMUNICATION NETWORK

TECHNICAL BACKGROUND

Transport control protocol (TCP) is a transport protocol widely used in the transmission of data across networks and internetworks, and is utilized by numerous application types. One concern when transporting large amounts of data across a network is network congestion, which can lead to deterioration in the capability of the network to transport data. TCP includes congestion control and avoidance methods that determine an appropriate congestion window for a network node or element by increasing the traffic through the network node until packet loss is detected. The use of an additive increase/multiplicative decrease feedback control algorithm in TCP causes a dramatic reduction in the rate of packet transmission from a network node when congestion is detected. TCP only enables endpoints to detect and address network node congestion. In addition, detection of congestion is accomplished by dropping and retransmitting packets.

The Explicit Congestion Notification (ECN) extension to TCP enables end-to-end notification of network congestion without dropping packets. For example, an ECN-aware router may provide an indication in an packet header in order to signal impending congestion instead of dropping a packet.

OVERVIEW

In a method of managing congestion in a wireless communication network, a first packet is received, a utilization of RF resources in the wireless communication network is determined, a distribution of modulation and coding schemes is received, and a network congestion metric is compared to a congestion criteria. The first packet is marked to indicate congestion in the wireless communication network when the packet does not indicate congestion in the wireless communication network, the utilization of RF resources meets a utilization criteria, and a network congestion metric meets the congestion criteria.

DETAILED DESCRIPTION

In an embodiment of a method of managing congestion in a wireless communication network, when a first packet is received, a utilization of RF resources in the wireless communication network is determined, and a distribution of modulation and coding schemes is received. When the packet does not indicate congestion in the wireless communication network, the utilization of RF resources is compared to a utilization criteria, and a network congestion metric is determined. When the utilization of RF resources meets a utilization criteria and the network congestion metric meets a congestion criteria, the first packet is marked to indicate congestion in the wireless communication network.

Figure 1:
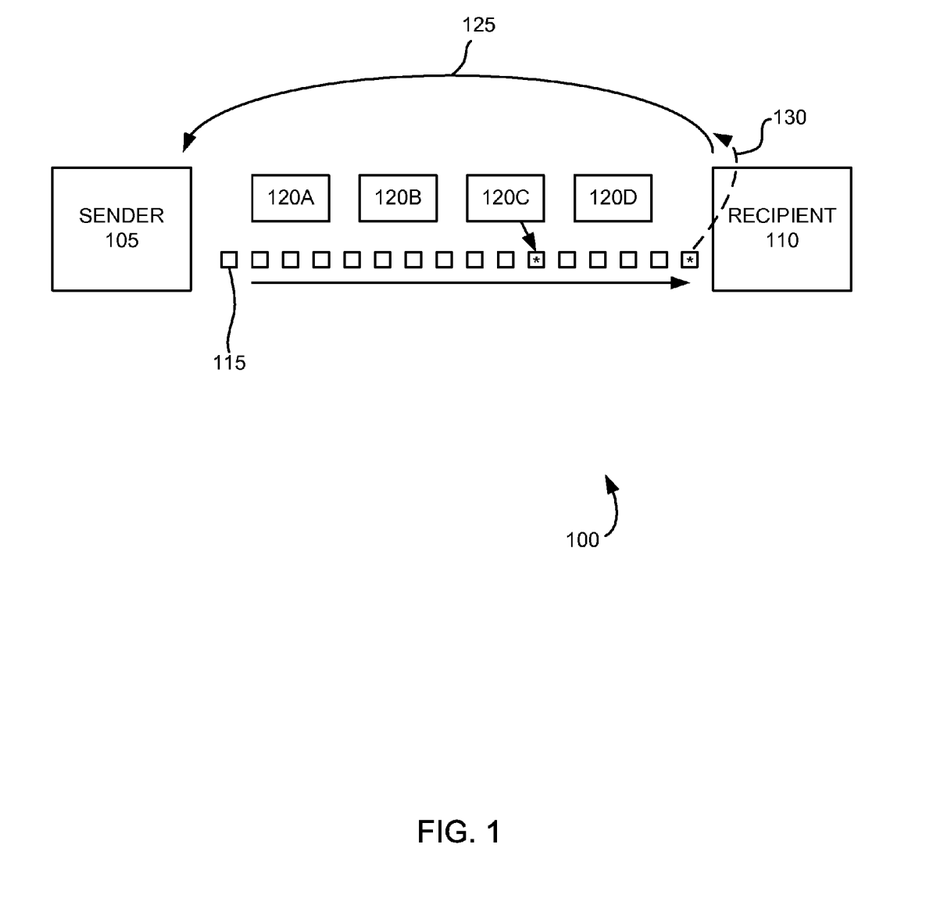
FIG. 1 illustrates an exemplary wired network implementing ECN.

FIG. 1 illustrates an exemplary wired network 100 implementing Explicit Congestion Notification (ECN). Wired network 100 comprises a sender network element 105, a recipient network element 110, and intermediate network elements 120A-120D. Sender 105 sends data packets destined for recipient 110. For example, sender 105 could be a server sending packets requested by recipient 110, which could be a client. Intermediate network elements 120A-120D pass data packets 115 from the sender 105 to the recipient and can be, for example, a switch or a router. The ECN extension to TCP enables end-to-end notification of network congestion without dropping packets, thus allowing the receiver 110 to receive the packet or packets which would otherwise have been dropped and avoiding packet retransmission. When ECN together with an active queue management (AQM) policy is implemented on intermediate network elements 120A-120D, incipient congestion can be detected at the network elements, for example at network element 120C. When congestion is detected, rather than dropping a packet, a packet can be marked to indicate network congestion. For example, network element 120C can mark a packet (symbolized by a packet with an asterisk) to indicate congestion. According to ECN, a codepoint in a field in a header of the packet can be marked to indicate that congestion is encountered (CE).

When the recipient 110 receives a packet marked to indicate congestion, the recipient 110 can send a message 130 based on the receipt of the congestion-marked packet to the sender through a feedback path 125. In an embodiment, the message 130 signals the sender 105 to reduce its congestion window, similar to TCP-only behavior. In response, the sender 105 reduces its packet transmission rate to alleviate the congestion detected in the network.

Figure 2:
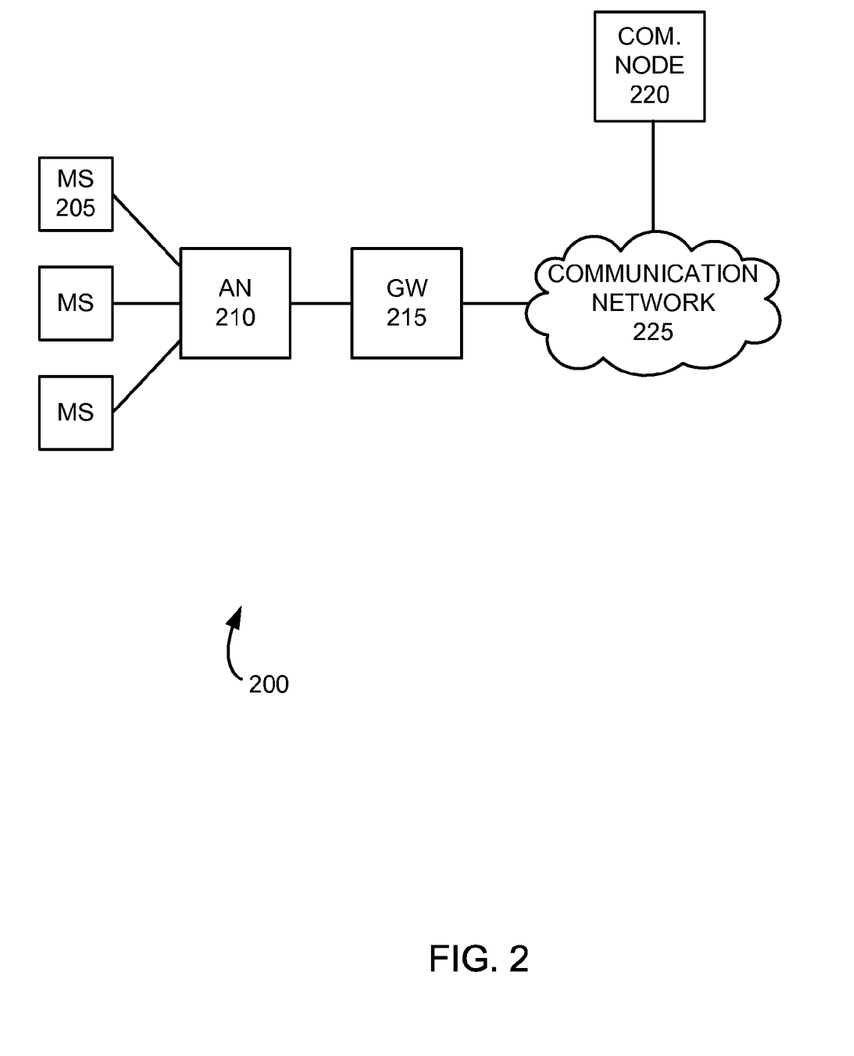
FIG. 2 illustrates an exemplary wireless communication system.

FIG. 2 illustrates an exemplary communication system 200 comprising mobile station 205, access node 210, communication network 215, and communication node 220. Other network elements may be present in the communication system 200 to facilitate wireless communication but are omitted for clarity, such as additional base stations, base station controllers, gateways, mobile switching centers, dispatch application processors, and location registers such as a home location register or visitor location register. Other network elements may also be present to facilitate communication between the computing node 220, the communication network 225, the gateway 215 and the access node 210 which are omitted for clarity, including additional processing nodes, routers, gateways, and physical and/or wireless data links for carrying data among the various network elements.

Examples of a mobile station 205 include a cell phone, a smart phone, a computing platform such as a laptop, palmtop, or tablet, a personal digital assistant, an internet access device, or other device capable of wireless communication, including combinations thereof. Access node 210 communicates with the mobile station 205, and can be, for example, a base transceiver station or an eNodeB device. Gateway 215 is a network element in communication system 200, and can be, for example, an access service network (ASN) gateway. Communication network 225 is a network or internetwork and is in communication with the gateway 215. Communication node 220 is a network node which permits the mobile station 205 to register with and communicate through a communication system, and is in communication with the communication network 225. The mobile station 205, the access node 210, the gateway 215, the communication network 225, and the communication node 220 each communicate over wired or wireless communication links or combinations thereof. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

In a method of managing congestion implemented in communication system 200, a first packet is received, for example at access node 210, or at gateway 215, or at mobile station 205, or another suitable network element. When the first packet is received, the first packet is examined to determine whether the first packet is already marked to indicate congestion in the wireless communication network. If the first packet is already marked, this will be taken into account when evaluating whether to mark the first packet, and when determining the anticipated availability of RF resources in the future. (As described above, when congestion is signaled back to the sender 105, the sender decreases its packet transmission rate, thus freeing up resources.)

In addition, a radio frequency (RF) utilization of resources in the communication network is determined. For example, the utilization of available RF resources between the access node 210 and mobile stations with which is it in communication (including mobile station 205) can be determined. If the utilization of RF resources (an RF utilization) is at or above a certain level, the RF utilization can be said to meet a utilization criteria. In one example, the RF utilization is an average RF utilization over a predetermined period of time to smooth out transient variations in RF usage cause by, among other things, traffic bursts and other changes in demands on RF resources.

In addition, a modulation and coding scheme (MCS) distribution can be determined. For example, the amount of utilized RF resources that are allocated various MCSs can be determined. Various MCSs are known in the art, including QPSK, 16QAM, 64QAM, and others. In an example, an MCS distribution is a percentage of the utilized RF resources allocated to different MCSs. For example, in a case where RF utilization is 75%, an MCS distribution can be 60% QPSK, 10% 16QAM, 5% 64QAM. Other possibilities for MCS distributions are possible.

A network congestion metric is also determined and is compared to a congestion criteria. The network congestion metric can be based on numerous factors. For example, the congestion metric can be based on the distribution of modulation and coding schemes described above. As another example, the network congestion metric can be based on the resources required by an application which has requested the first packet. As but one example of resources required by an application, a web browsing application requires fewer network and RF resources than a streaming video application to provide data per unit time to the application. The application can be, for example, an application run on the mobile station 205.

The network congestion metric can also be based on an MCS to be assigned to the packet. For example, based on the RF utilization, the distribution of MCSs, and the requirements of the application, a particular MCS will be assigned to the packet for transmission to a mobile station. The network congestion metric can also be based on a flow requirement associated with the packet. The flow requirement can be based on, for example, a quality of service requirement for the packet. The flow requirement can also be based on a scheduling service, such as the scheduling services specified in the IEEE 802.16 standard. The flow requirement can also be based on a service level agreement with a subscriber.

The network congestion metric can also be based on an estimated availability of RF resources. For example, if a packet received prior to the first packet was marked to indicate congestion in the network, then when the previous packet is received at the recipient (e.g., recipient 110), network congestion will be signaled back to the sender (e.g., sender 105). When congestion is signaled back to the sender 105, the sender will reduce its packet transmission rate, freeing up RF resources. The resources to be freed up can thus be anticipated in the communications network. The estimated availability of RF resources can also include which MCS or MCSs are associated with RF resources anticipated to be available, and an approximate time when the freed-up RF resources will be available.

When the packet does not indicate congestion in the wireless communication network, the utilization of RF resources meets a utilization criteria, and a network congestion metric meets a congestion criteria, the first packet is marked to indicate congestion in the wireless communication network.

Figure 3:
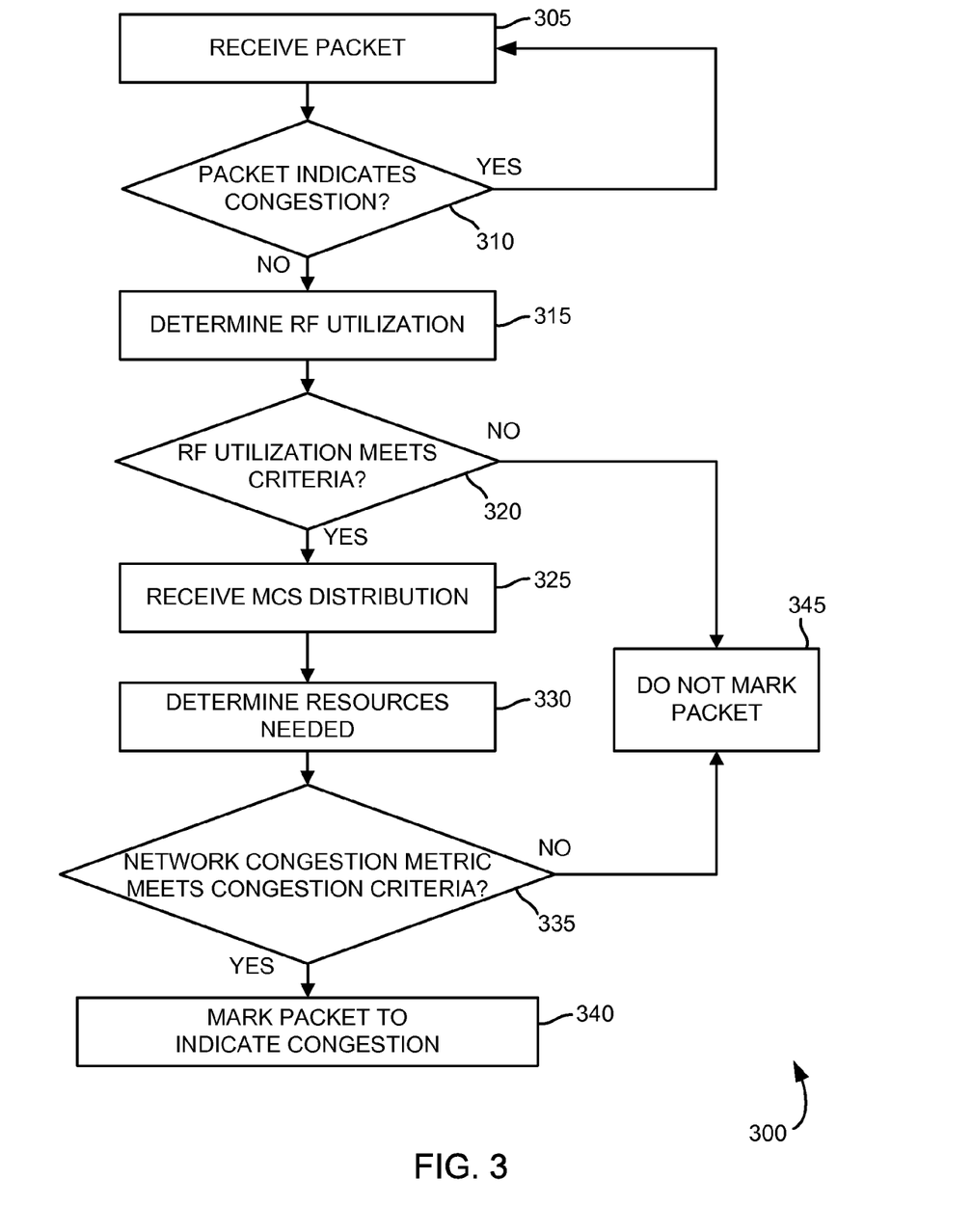
FIG. 3 illustrates an exemplary method of managing congestion in a wireless communication network.

FIG. 3 illustrates an exemplary method 300 of managing congestion in a wireless communication network. In operation 305, a first packet is received, for example at access node 210, or at gateway 215, or at mobile station 205, or another suitable network element. When the first packet is received, the first packet is examined to determine whether the first packet is already marked to indicate congestion in the wireless communication network (operation 310). If the first packet is already marked, this will be taken into account not only when evaluating whether to mark the first packet, but also when determining the anticipated availability of RF resources in the future.

In operation 315, an RF utilization of resources in the communication network is determined. For example, the utilization of available RF resources between the access node 210 and mobile stations with which is it in communication (including mobile station 205) can be determined. If the utilization of RF resources (an RF utilization) is at or above a certain level, the RF utilization can be said to meet a utilization criteria. In one example, the RF utilization is an average RF utilization over a predetermined period of time to smooth out transient variations in RF usage cause by, among other things, traffic bursts and other changes in demands on RF resources. If the RF utilization does not meet a utilization criteria, for example if the RF utilization is not high enough to indicate current or incipient network congestion, then the packet is not marked to indicate congestion (320-NO to operation 345).

In operation 325, an MCS distribution can be determined when an RF utilization meets a utilization criteria. For example, the amount of utilized RF resources that are allocated various MCSs can be determined. For example, in a case where RF utilization is 85%, an MCS distribution can be 60% QPSK, 15% 16QAM, 10% 64QAM. Other possibilities for MCS distributions are possible.

In operation 330, the resources required to deliver the packet to an application which has requested the packet are determined. As but one example of resources required by an application, a web browsing application requires fewer network and RF resources than a streaming video application to provide data per unit time to the application. The application can be, for example, an application run on the mobile station 205.

In operation 335, a network congestion metric is determined and is compared to a congestion criteria. The network congestion metric can be based on numerous factors. For example, the congestion metric can be based on the distribution of modulation and coding schemes described above. As another example, the network congestion metric can be based on the resources required by an application which has requested the first packet.

The network congestion metric can also be based on an MCS to be assigned to the packet. For example, based on the RF utilization, the distribution of MCSs, and the requirements of the application, a particular MCS will be assigned to the packet for transmission to a mobile station. The network congestion metric can also be based on a flow requirement associated with the packet. The flow requirement can be based on, for example, a quality of service requirement for the packet. The flow requirement can also be based on a scheduling service, such as the scheduling services specified in the IEEE 802.16 standard. The flow requirement can also be based on a service level agreement with a subscriber. In one example, the flow requirement includes a maximum latency and a minimum throughput of the packet.

The network congestion metric can also be based on an estimated availability of RF resources. For example, if a packet received prior to the first packet was marked to indicate congestion in the network, then when the previous packet is received at the recipient (e.g., recipient 110), network congestion will be signaled back to the sender (e.g., sender 105). When congestion is signaled back to the sender 105, the sender will reduce its packet transmission rate, freeing up resources. The resources to be freed up can thus be anticipated in the communications network. The estimated availability of RF resources can also include which MCS or MCSs are associated with RF resources anticipated to be available, and an approximate time when the RF resources will be available.

When the congestion metric does not meet the congestion criteria, the packet is not marked to indicate congestion (operation 345). When the packet does not indicate congestion in the wireless communication network, in operation 340 the utilization of RF resources meets a utilization criteria, and a network congestion metric meets a congestion criteria, the first packet is marked to indicate congestion in the wireless communication network.

Figure 4:
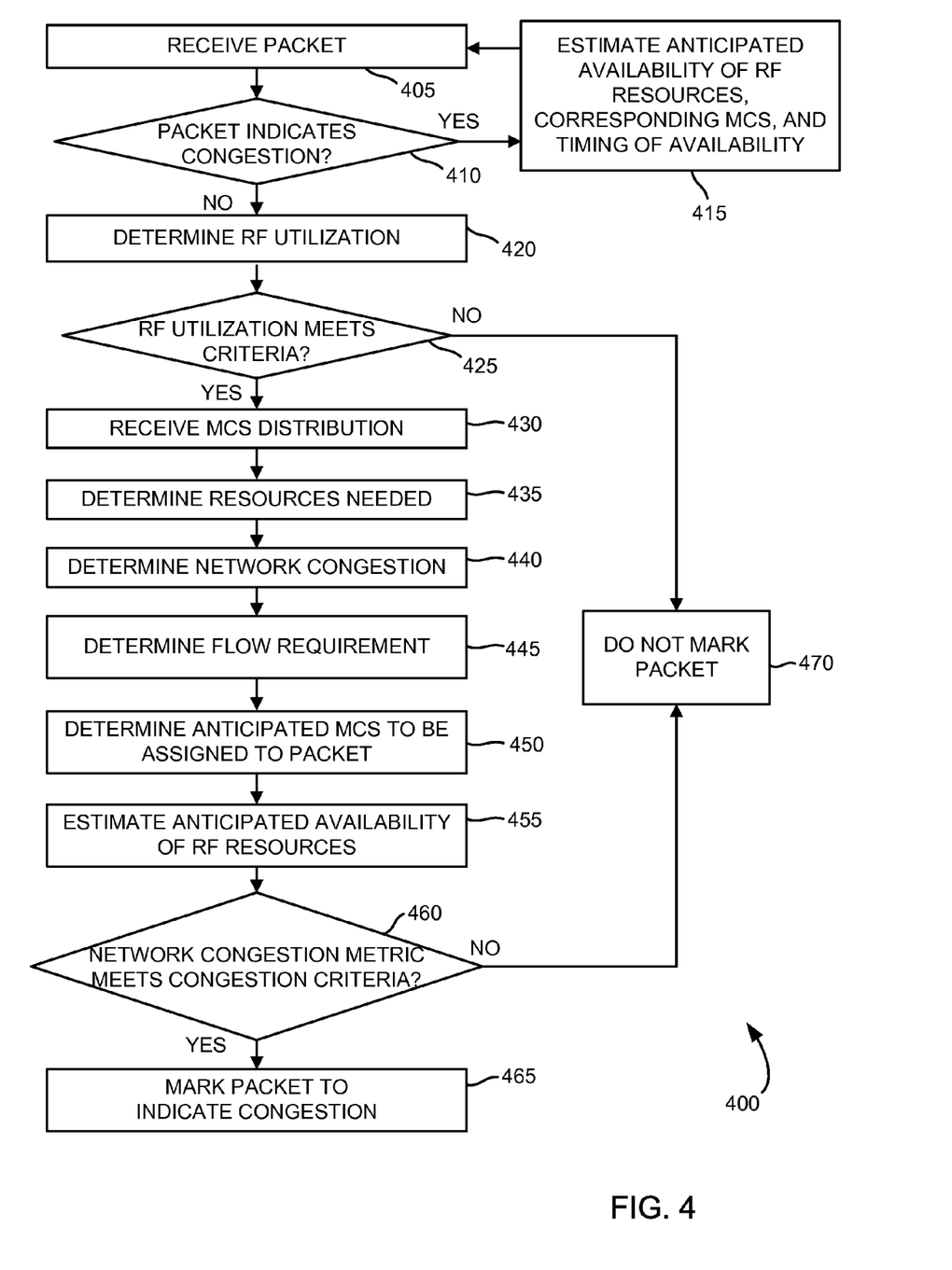
FIG. 4 illustrates another exemplary method of managing congestion in a wireless communication network.

FIG. 4 illustrates another exemplary method 400 of managing congestion in a wireless communication network. In operation 405, a first packet is received, for example at access node 210, or at gateway 215, or at mobile station 205, or another suitable network element. When the first packet is received, the first packet is examined to determine whether the first packet is already marked to indicate congestion in the wireless communication network (operation 410). If the first packet is already marked, the anticipated availability of RF resources is determined (operation 415). The estimated availability of RF resources can also include which MCS or MCSs are associated with RF resources anticipated to be available, and an approximate time when the RF resources will be available.

In operation 420, an RF utilization of resources in the communication network is determined. For example, the utilization of available RF resources between the access node 210 and mobile stations with which is it in communication (including mobile station 205) can be determined. If the RF utilization is at or above a certain level, the RF utilization can be said to meet a utilization criteria. In one example, the RF utilization is an average RF utilization over a predetermined period of time to smooth out transient variations in RF usage cause by, among other things, traffic bursts and other changes in demands on RF resources. In operation 425, if the RF utilization does not meet a utilization criteria, for example if the RF utilization is not high enough to indicate current or incipient network congestion, then the packet is not marked to indicate congestion (425-NO to operation 470).

In operations 430-455, a network congestion metric is determined. The network congestion metric can be based on numerous factors, described below.

For example, in operation 430, if an RF utilization meets a utilization criteria, an MCS distribution can be received, for example, from the access node 210. For example, the amount of utilized RF resources that are allocated various MCSs can be determined. For example, in a case where RF utilization is 85%, an MCS distribution can be 60% QPSK, 15% 16QAM, 10% 64QAM. Other possibilities for MCS distributions are possible.

In operation 435, the resources required to deliver the packet to an application which has requested the packet are determined. For example, resources required by an application, a web browsing application requires fewer network and RF resources than a streaming video application to provide data per unit time to the application. The application can be, for example, an application run on the mobile station 205.

In operation 440, the presence of current network congestion is determined. For example, if a previously-received packet which was marked to indicate congestion in the network was received, the existence of current network congestion could be determined. In one example, it is determined that a packet marked to indicate congestion was received within a prior predetermined time period, for example, 5 minutes. Thus, if a packet indicated network congestion had been received in the 5 minutes prior to the processing of the first packet, the presence of current network congestion can be determined.

In operation 445, a flow requirement associated with the packet is determined. The flow requirement can be based on, for example, a quality of service requirement for the packet. The flow requirement can also be based on a scheduling service, such as the scheduling services specified in the IEEE 802.16 standard. The flow requirement can also be based on a service level agreement with a subscriber. In one example, the flow requirement includes a maximum latency and a minimum throughput of the packet.

In operation 450, an MCS to be assigned to the packet is determined. For example, based on the RF utilization, the distribution of MCSs, and the requirements of the application, a particular MCS will be assigned to the packet for transmission to a mobile station.

In operation 455, an estimated availability of RF resources can be determined. For example, if a packet received prior to the first packet was marked to indicate congestion in the network, then when the previous packet is received at the recipient (e.g., recipient 110), network congestion will be signaled back to the sender (e.g., sender 105). When congestion is signaled back to the sender 105, the sender will reduce its packet transmission rate, freeing up resources. The resources to be freed up can thus be anticipated in the communications network. The estimated availability of RF resources can also include which MCS or MCSs are associated with RF resources anticipated to be available, and an approximate time when the RF resources will be available. The approximate time can be a predetermined time period, so that the determination includes determining the availability of RF resources within a future predetermined time period.

When the congestion metric does not meet the congestion criteria, the packet is nor marked to indicate congestion (operation 470). When the packet does not indicate congestion in the wireless communication network, in operation 465 the utilization of RF resources meets a utilization criteria, and a network congestion metric meets a congestion criteria, the first packet is marked to indicate congestion in the wireless communication network.

Figure 5A:
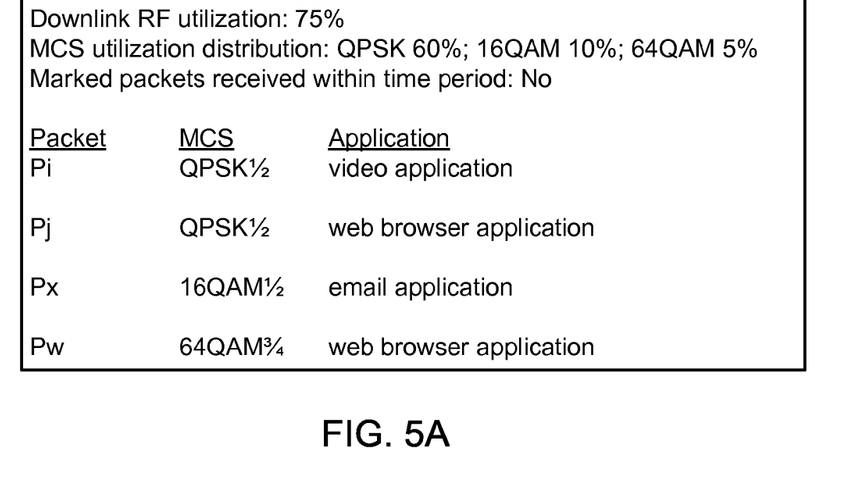
FIG. 5A illustrates certain criteria used in an exemplary method of managing congestion in a wireless communication network
Figure 5B:
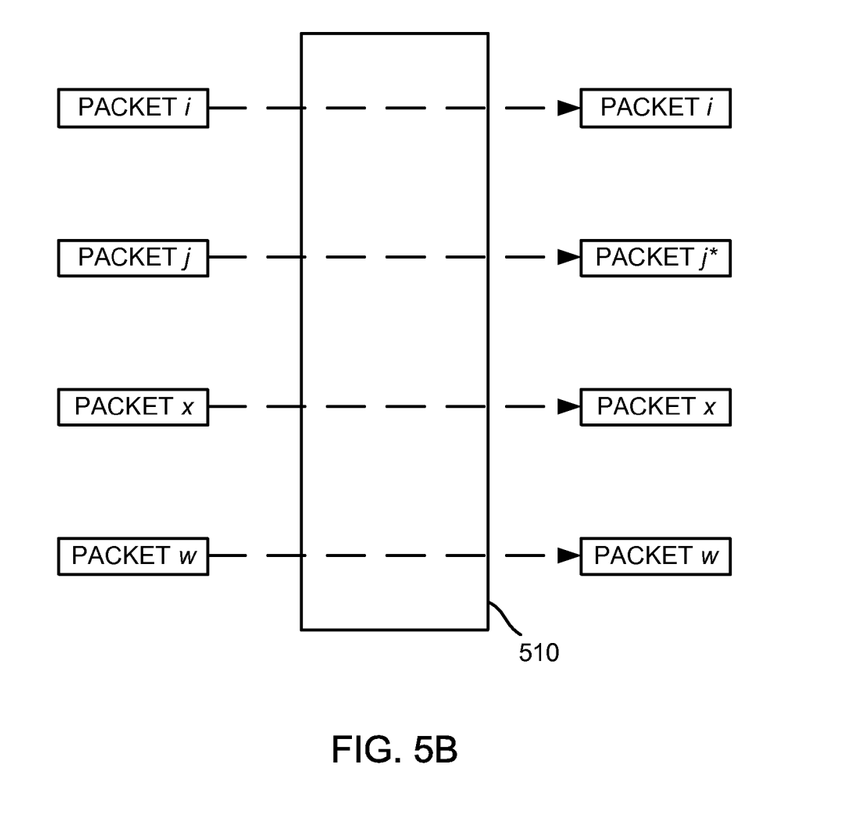
FIG. 5B illustrates an example of packets handled by a processing node.

FIG. 5A illustrates one example of criteria used in an exemplary method of managing congestion in a wireless communication network, and FIG. 5B illustrates an example of packets processed by a processing node. In the example illustrated in FIG. 5A, an RF utilization of a downlink, for example between access node 210 and mobile station 205, is determined to be 75%. Also, the MCS distribution of the utilized RF resources is determined to be: 60% of RF resources designated as QPSK, 10% designated at 16QAM, and 64QAM designated as 5%. In the example illustrated in FIG. 5A, no packets indicating existing network congestion have been received in a predetermined time period (for example, 5 minutes, though other time periods are possible). Also, FIG. 5A illustrates four packets, Pi, Pj, Px and Pw. Pi is a packet requested by a video application, for example, being run on mobile station 205, and which will be assigned an MCS QPSK½. Packet Pj is requested by a web browser application, and will be also assigned MCS QPSK½. Packet Px is requested by an email application, and will be assigned MCS 16QAM½. Pw is a packet requested by the web browsing application, and will be assigned MCS 64QAM¾.

FIG. 5B illustrates the processing of each of packets Pi, Pj, Px and Pw at a processing node 510, with reference to FIGS. 3 and 4. When they are received at processing node 510, none of the packets Pi, Pj, Px and Pw are marked to indicate current network congestion. As illustrated in FIG. 5A, the downlink RF utilization is at 75%. The RF utilization is compared to a utilization criteria, which in this example is 70% utilization.

First, packet Pi is received at processing node 510. It is determined that packet Pi is not marked to indicate network congestion. The RF utilization is determined to be at 75%, which meets the utilization criteria of 70%. The MCS distribution is received and is determined to be QPSK 60%, 16QAM 10%, and 64QAM 5%. Packet Pi is requested by a video application, which is a latency-sensitive application, and the required resources are determined accordingly. In addition, the flow requirement of packet Pi, based at least in part on the data needs of the video application and on a quality of service requirement, are determined. In addition, it is determined that packet Pi will be assigned an MCS of QPSK½, based at least in part on the current RF conditions, an assigned channel frequency, a signal power associated with the channel, the application which requested the packet, the flow requirements of the packet, and any quality of service requirement associated with the packet. Estimated availability of RF resources is also determined, for example, whether any RF resources allocated to the QPSK MCS are anticipated to become available. Based on the above factors, it is determined not to mark packet Pi to indicate network congestion.

Packet Pj is then received. It is determined that packet Pj is not marked to indicate network congestion. The RF utilization is determined to be at 75%, which meets the utilization criteria of 70%. The MCS distribution is received and is determined to be QPSK 60%, 16QAM 10%, and 64QAM 5%. Packet Pj is requested by a web browser application, which is not a latency-sensitive application, and the required resources are determined accordingly. In addition, the flow requirement of packet Pj, based at least in part on the data needs of the video application and on a quality of service requirement, are determined. In addition, it is determined that packet Pi will be assigned an MCS of QPSK½, based at least in part on factors as described above regarding packet Pi. Estimated availability of RF resources is also determined, for example, whether any RF resources allocated to the QPSK MCS are anticipated to become available. In this case it is determined to mark packet Pj to indicate network congestion (indicated by an asterisk in FIG. 5B) in order to reduce the utilization of RF resources allocated to QPSK MCS.

Subsequently received packets Px and Pw are determined not to indicate network congestion, and the RF utilization and MCS distribution is received as described above. The required resources are determined for an email application and a web browser application, for packets Px and Pw, respectively. The flow requirements of packets Px and Pw are determined, and the anticipated MCS to be assigned to each is determined. In the processing of packets Px and Pw, the fact that packet Pj was marked to indicate network congestion is also considered, as is the relatively low MCS distribution allocated to 16AQAM (10%) and 64QAM (5%). Since packet Pj was marked to indicate congestion, RF resources allocated to QPSK will be freed up in the near future when the recipient of packet Pj signals the sender that Pj is marked to indicate congestion. Taking the above factors into consideration, packets Px and Pw are not marked to indicate congestion.

Figure 6:
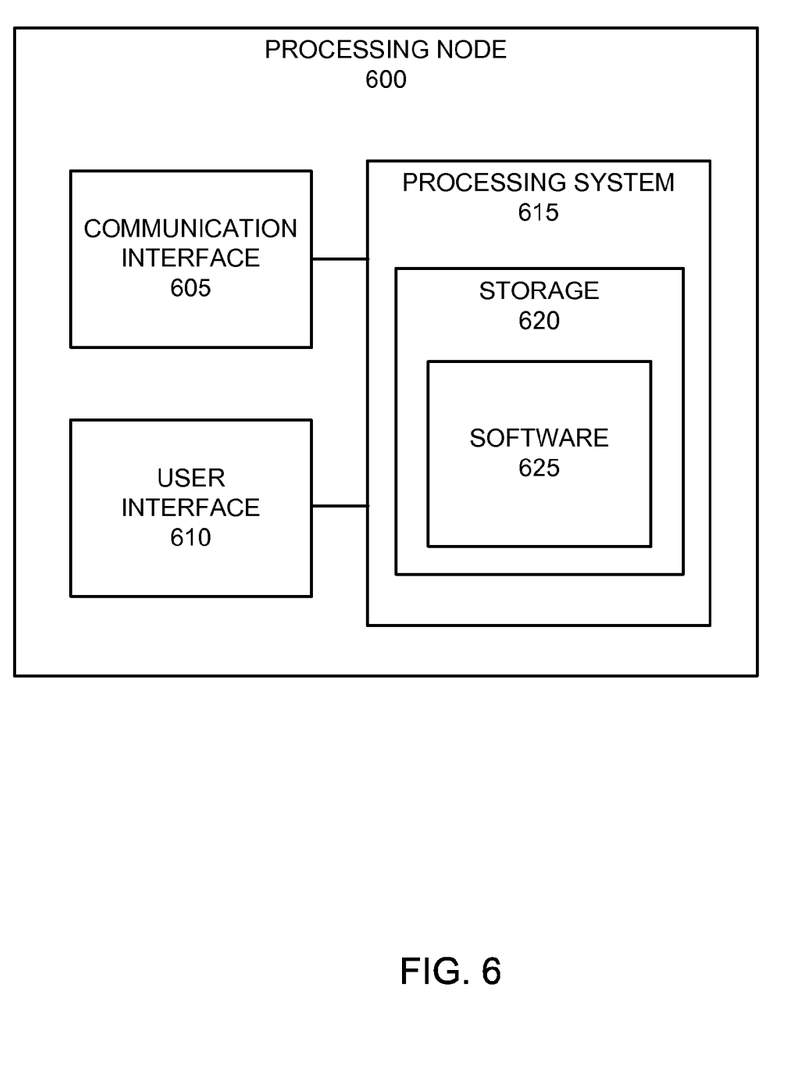
FIG. 6 illustrates an exemplary processing node.

FIG. 6 illustrates an exemplary processing node 600. Processing node 600 can be, for example, an access node or a gateway, or it can be another network element of a communication system. Processing node 600 can include a communication interface 605 and a user interface 610, each in communication with a processing system 615. Processing node 600 can communicate with other network elements, including mobile stations and other processing nodes, over a wired and/or wireless communication link through the communication interface 605.

Processing system 615 can include storage 620. Storage 620 comprises a disk drive, flash drive, memory circuitry, or other memory device. Storage 620 can store software 625 which is used in the operation of the processing node 600. Software 625 may include an operating system, utilities, drivers, network interfaces, applications, or some other type of software. Processing node 600 can also include a user interface 610 to permit a user to configure and control the operation of the processing node 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of managing congestion in a wireless communication network, comprising:
  receiving a first packet, wherein the received first packet does not indicate congestion in the wireless communication network;
  determining a utilization of RF resources in the wireless communication network;
  comparing the utilization of RF resources to a utilization criteria;
  receiving a distribution of modulation and coding schemes that indicates a utilization for each modulation and coding scheme in the distribution;

determining resources needed to deliver the first packet to a wireless device running an application that requested the first packet;

comparing a network congestion metric to a congestion criteria, wherein the network congestion metric is based on the distribution of modulation and coding schemes, the resources needed by the application, a modulation and coding scheme to be assigned to the first packet, a flow requirement, and an estimated availability of RF resources;

marking the first packet to indicate congestion when the utilization of RF resources meets or exceeds the utilization criteria and the network congestion metric meets or exceeds the congestion criteria; and not marking the first packet when the utilization of RF resources is below the utilization criteria and the network congestion metric is below the congestion metric.

2. The method of claim 1, wherein the utilization of RF resources is an average RF utilization over a first predetermined time period.

3. The method of claim 1, wherein the distribution of modulation and coding schemes is an allocation of the RF resources to at least two modulation and coding schemes.

4. The method of claim 1, wherein the resources needed by the application are associated with the applications of the wireless device in communication with the wireless communication network.

5. The method of claim 1, wherein the flow requirement comprises at least one of a maximum latency and a minimum throughput of the first packet.

6. The method of claim 5, wherein the flow requirement is determined based on the resources needed by an application.

7. The method of claim 1, wherein the estimated availability of the RF resources is a determination of whether the distribution of modulation and coding schemes will change within a second predetermined time period.

8. The method of claim 7, wherein the estimated availability of the RF resources is a determination of whether an allocation of the RF resources to at least two modulation and coding schemes will change within the second predetermined time period.

9. The method of claim 1, wherein the receiving a first packet further comprises receiving a first packet at a network node of the wireless communication system.

10. The method of claim 9, wherein the receiving a first packet further comprises receiving the first packet at one of a radio access node of the wireless communication network and a gateway of the wireless communication network.

11. The method of claim 1 further comprising:
transmitting the first packet to a wireless device of the wireless communication network.

12. The method of claim 1, wherein receiving a first packet further comprises:

receiving a first packet from a wireless device in communication with the wireless communication network.

13. The method of claim 1, further comprising:
receiving a second packet; and
marking the second packet to indicate congestion in the network based on the marking the packet, the distribution of modulation and coding schemes, resources needed by an application, a modulation and coding scheme to be assigned to the packet, a flow requirement, and an estimated availability of RF resources.

14. A method of managing congestion in a wireless communication network, comprising:
receiving a first packet,
wherein, when the received first packet indicates congestion in the wireless communication network:
estimating an anticipated availability of RF resources, wherein the availability of RF resources includes modulation and coding schemes associated with the RF resources and an approximate time when the RF resources will be available; and
wherein, when the received first packet does not indicate congestion in the wireless communication network:
determining a utilization of RF resources in the wireless communication network;
comparing the utilization of RF resources to a utilization criteria;
marking the first packet to indicate congestion when the utilization of RF resources meets or exceeds the utilization criteria and the network congestion metric meets or exceeds the congestion criteria; and
not marking the first packet when the utilization of RF resources is below the utilization criteria and the network congestion metric is below the congestion metric.

15. The method of claim 14, wherein the estimating an availability of RF resources further comprises estimating an availability of RF resources based on whether the distribution of modulation and coding schemes will change within a predetermined time period.

16. The method of claim 15, wherein the wherein the estimating an availability of RF resources further comprises estimating an availability of RF resources based on whether an allocation of the RF resources to at least two modulation and coding schemes will change within the predetermined time period.

17. The method of claim 15, further comprising:
receiving a second packet; and
marking the second packet to indicate congestion in the network based on the utilization of RF resources in the wireless communication network, the distribution of modulation and coding schemes, and the estimated availability of RF resources and at least one modulation and coding scheme associated with the RF resources.

* * * * *